(12) United States Patent
Scharrer

(10) Patent No.: US 11,035,486 B2
(45) Date of Patent: Jun. 15, 2021

(54) SPHERICAL VALVE STEM SEAT

(71) Applicant: T-Lon Products, Inc., Hartland, WI (US)

(72) Inventor: Jon Scharrer, Johnson Creek, WI (US)

(73) Assignee: T-LON PRODUCTS, INC., Hartland, WI (US)

( * ) Notice: Subject to any disclaimer, the term of this patent is extended or adjusted under 35 U.S.C. 154(b) by 94 days.

(21) Appl. No.: 16/385,617

(22) Filed: Apr. 16, 2019

(65) Prior Publication Data

US 2019/0316702 A1 Oct. 17, 2019

Related U.S. Application Data

(60) Provisional application No. 62/658,692, filed on Apr. 17, 2018.

(51) Int. Cl.
| | |
|---|---|
| *F16K 1/46* | (2006.01) |
| *F16K 1/36* | (2006.01) |
| *F16K 27/06* | (2006.01) |
| *F16K 5/20* | (2006.01) |
| *F16K 5/06* | (2006.01) |
| *F16K 1/44* | (2006.01) |

(52) U.S. Cl.
CPC .......... *F16K 27/067* (2013.01); *F16K 5/0605* (2013.01); *F16K 5/0689* (2013.01); *F16K 5/201* (2013.01); *F16K 1/44* (2013.01)

(58) Field of Classification Search
CPC . F16K 1/36; F16K 1/46; F16K 25/005; F16K 1/14; F16K 1/12; F16K 1/04
See application file for complete search history.

(56) References Cited

U.S. PATENT DOCUMENTS

| | | | |
|---|---|---|---|
| 413,518 A | 10/1889 | Jones | |
| 2,285,343 A * | 6/1942 | Marchand, Jr. | ......... F16K 1/385 137/243.3 |
| 2,876,982 A | 3/1959 | Snider | |
| 3,070,116 A * | 12/1962 | Noland | ..................... E03B 9/02 137/302 |
| 3,099,999 A | 8/1963 | Vismara | |
| 3,227,174 A | 1/1966 | Yost | |
| 3,429,552 A * | 2/1969 | Erickson | ............. F16K 31/0658 251/129.17 |

(Continued)

FOREIGN PATENT DOCUMENTS

| | | |
|---|---|---|
| CH | 694279 | 10/2004 |
| CN | 2168139 | 6/1994 |

(Continued)

OTHER PUBLICATIONS

Apollo Valves; Check Valves Catalog; undated; 6 pages.
"High Quality Replacement Parts for the Sanitary Processing, Industries", DSO Fluid Handling, 2018 8 pgs.

*Primary Examiner* — Marina A Tietjen
(74) *Attorney, Agent, or Firm* — Ryan Kromholz & Manion, S.C.

(57) ABSTRACT

An at least one spherical valve stem seat and a method for manufacturing the at least one spherical valve stem seat. The at least one spherical valve stem seat has a finished valve stem seat blank and a shell in retained communication therewith. The method for manufacturing the at least one spherical valve stem seat includes a molding process and an accompanying sintering, and machining process.

11 Claims, 4 Drawing Sheets

(56) References Cited

U.S. PATENT DOCUMENTS

| | | | |
|---|---|---|---|
| 4,235,416 A | | 11/1980 | LaCoste et al. |
| 4,316,481 A | * | 2/1982 | Fillman .................. E03B 9/025 |
| | | | 137/302 |
| 4,372,339 A | * | 2/1983 | Anderson ................ E03B 9/04 |
| | | | 137/288 |
| 4,501,407 A | | 2/1985 | Murray |
| 4,532,954 A | * | 8/1985 | Fillman .................. E03B 9/025 |
| | | | 137/302 |
| 4,570,665 A | | 2/1986 | Zimmerly |
| 4,759,530 A | | 7/1988 | Iff |
| 5,044,604 A | | 9/1991 | Topham et al. |
| 5,141,018 A | | 8/1992 | Guterman |
| 5,289,840 A | * | 3/1994 | Anderson ................ E03B 9/04 |
| | | | 137/15.02 |
| 5,996,966 A | | 12/1999 | Zimmerly |
| 6,382,239 B1 | | 5/2002 | Zimmerly |
| 6,823,893 B2 | | 11/2004 | Hebmuller |
| 7,537,194 B2 | | 5/2009 | Nagai |
| 8,702,056 B2 | | 4/2014 | Crochet, Sr. et al. |
| 9,506,569 B2 | | 11/2016 | Moren |
| 9,683,664 B2 | | 6/2017 | Nielsen et al. |
| 2005/0109974 A1 | | 5/2005 | Antunes Guimaraes et al. |

FOREIGN PATENT DOCUMENTS

| | | |
|---|---|---|
| CN | 2351632 | 12/1999 |
| CN | 102661438 | 9/2012 |
| CN | 102777608 | 11/2012 |
| CN | 204420239 | 6/2015 |
| DE | 10045282 | 3/2002 |

\* cited by examiner

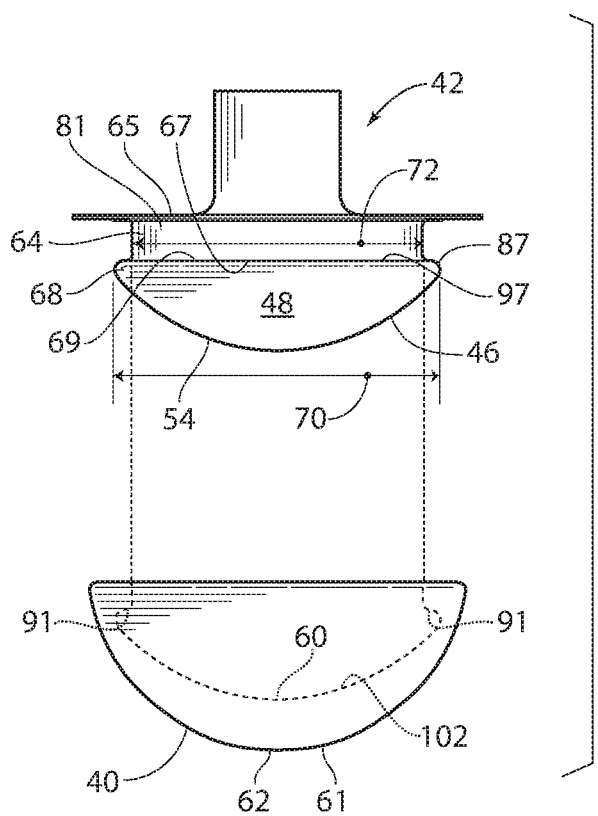
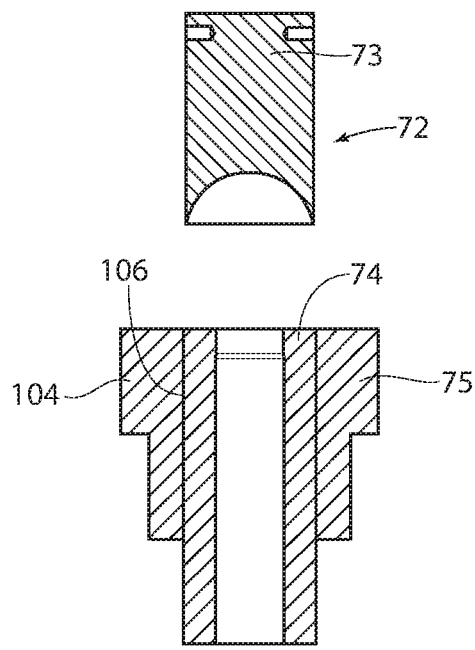
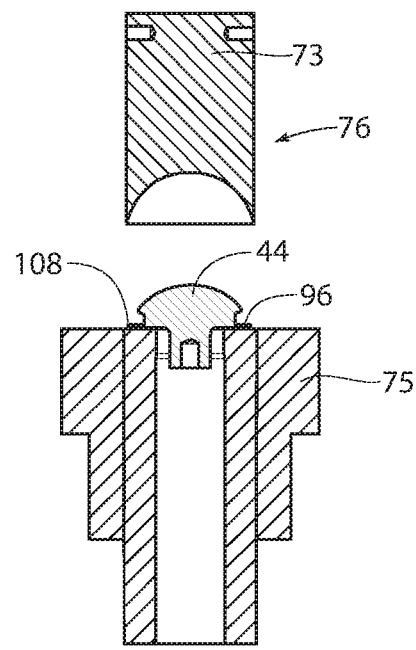
Fig. 5
Fig. 6A
Fig. 6B

SPHERICAL VALVE STEM SEAT

RELATED APPLICATIONS

This application claims the benefit of U.S. Provisional Patent Application Ser. No. 62/658,692, filed 17 Apr. 2018.

BACKGROUND OF THE INVENTION

This invention relates to valves. More specifically, this invention relates to valve stem seats. Further, more specifically, this invention relates to spherical valve stem seats and a method for manufacturing a spherical valve stem seats.

Valves are employed for the control of fluid transfers, whether the fluid is in the form of at least one gas or at least one liquid or a combination of at least one gas and at least one liquid. Valves take numerous geometric forms dependent upon the application in which the valve is applied. Further, valves may be actuated by pneumatic, hydraulic, or mechanical means or a combination of at least one of pneumatic, hydraulic and mechanical means.

Valve mechanisms comprise an input to receive at least one of a pneumatic, hydraulic and mechanical means for advancing the valve stem and seat, a housing and a valve. The valve is actuated to control the flow of fluid. The valve stem contains the seat which communicates with the section of the valve assembly attached to the valve to control the flow of fluid.

Valve mechanisms are employed in numerous environments. In food processing, hygiene and sanitary products production, valve assemblies are ideally made of stainless steel. The stainless steel provides for a sanitary structure. Further, rubber coated stainless steel provides for a robust seat which can withstand the impacts on the section of the valve mechanism or other assembly when actuated to control the flow of liquid by an at least one of a pneumatic, hydraulic and mechanical means. Valves employed in sanitary environments require the use of harsh chemical solutions to clean and sanitize the valves and the assemblies attached to the valve.

However, the chemical solutions and process of using the chemical solutions degrade the rubber applied to the stainless steel of the valve stem seat.

A solution is needed to provide for a valve stem seat having the structural integrity to withstand impact when the valve is closed.

A solution is needed to provide for a valve stem seat which withstands degradation due to the application of chemical cleaning and sanitizing solutions.

A solution is needed to provide for a method of manufacturing a valve stem seat possessing the structural integrity to withstand impact when the valve is closed, and possessing properties which withstand degradation due to the application of chemical cleaning and sanitizing solutions.

SUMMARY OF THE INVENTION

This invention relates to valves. More specifically, this invention relates to valve stem seats. Further, more specifically, this invention relates to spherical valve stem seats and a method for manufacturing spherical valve stem seats.

A pneumatically actuated valve may comprise at least one fluid inlet, an at least one cylinder, a frame structure, an at least one valve stem, an at least one valve stem seat, and a fluid outlet. An at least one cylinder second end may be in communication with the frame structure at an at least one frame structure first end. The frame structure may have a frame structure second end in communication with the valve body. The frame structure may provide for an open frame structure cavity.

The at least one valve stem may be in communication with the at least one valve mechanism. The at least one valve stem may provide for a valve stem length. The valve stem length may provide for a valve stem first end. The valve stem first end may be in communication with the at least one valve stem seat.

The valve body may provide for an at least one parabolic valve seat, herein the valve seat head may be in removable communication with the at least one parabolic valve seat to provide for control of the movement of the fluid through the valve body.

The at least one valve stem seat may comprise a base assembly and the stem seat head. The base assembly may preferably have a hemispherical geometry. The base assembly may comprise a base assembly first side and a base assembly second side, opposite the base assembly first side.

A mounting extension may be formed at the base assembly first side. The mounting extension may have a mounting extension second end and a mounting extension length extending from the mounting extension first end and the base assembly. The mounting extension second end may provide for a bore.

The base assembly may have an arched perimeter. The arched perimeter may have a terminal edge.

The valve stem seat head may have a hemispherical geometry. The hemispherical geometry of the stem seat head may be characterized by a stem seat head terminal edge. The stem seat head terminal edge may characterize a stem seat head perimeter. The terminal edge and the stem seat head terminal edge may preferably be in continuous communication about a terminal edge/stem seat head terminal edge intersection.

The at least one valve stem seat may comprise a finished valve stem seat blank in communication with a machinable shell. The finished valve stem seat blank may comprise a first section, a second section, the base assembly, and the mounting extension. The first section may be characterized by a cylindrical shape. The cylindrical shape may have a first section base diameter. A second section base may be characterized by a second section base diameter. The first section diameter may be less than the second section base diameter. A lip may characterize the differences in the first section diameter and the second section base diameter.

The shell may comprise a shell first side and a shell second side. The shell second side may define the hemispherical geometry of the stem seat head. The shell first side may provide a negative geometry of a first section/second section perimeter wherein the shell first side is in substantially continuous communication with the first section/second section perimeter. The negative geometry of the shell first side may provide for a shelf, wherein the lip and shelf are in substantial communication to provide for retaining the shell to the finished valve stem seat blank.

It is noted the at least one valve stem seat may comprise the mounting extension, base assembly, first section and second section, wherein the at least one valve stem seat may be a singular unit. The at least one valve stem seat blank may preferably be comprised of stainless steel.

The shell may preferably be comprised of a resin of Polytetrafluoroethylene (PTFE). Alternatively, the shell may be comprised of another material providing the desired wear and sealing properties.

An intended benefit of the invention is to provide for a valve stem seat having the structural integrity to withstand impact when the valve is closed.

An intended benefit of the invention is to provide for a valve stem seat which withstands degradation due to the application of chemical cleaning and sanitizing solutions.

A method of manufacturing the at least one valve stem seat is described as follows. The method of manufacturing the at least one valve stem seat may involve a compression molding process. Positioning an upper punch in close proximity to a bottom punch assembly. Placing a stem seat blank on a bottom punch first surface. Lowering the bottom punch with the stem seat blank on the bottom punch first surface to a bottom punch second position. Filling a cavity with a resin. Preferably, the resin is PTFE. Alternatively, the resin may be another material providing the desired wear and sealing properties. Lowering the upper punch, containing a hemispherical cross-section on an upper punch first side. Raising the bottom punch to the lower punch first position. Removing the post molding process valve stem seat from the bottom punch, and placing the post molding process valve stem seat in a sintering oven.

Turning a chamfer on a post-sintering shell having a second dimension of the stem seat head, thus creating the shell. Rolling a metal flange of the base assembly, creating the arched perimeter of the base assembly. Removing excess metal flange, creating a profile finish of the terminal edge/stem seat head terminal edge intersection and the at least one stem seat valve.

An intended benefit of the invention is to provide for a method of manufacturing a valve stem seat possessing the structural integrity to withstand impact when the valve is closed, and possessing properties which withstand degradation due to the application of chemical cleaning solutions.

BRIEF DESCRIPTION OF THE DRAWINGS

FIG. 5 is an exploded side view of the at least one valve stem seat.

FIG. 6A is a cross-sectional view of a method for making the at least one valve stem seat illustrating an upper punch, a bottom punch and a collar used in the method.

FIG. 6B is a cross-sectional view of the method for making the at least one valve stem seat, illustrating placement of a valve stem seat blank on the bottom punch.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
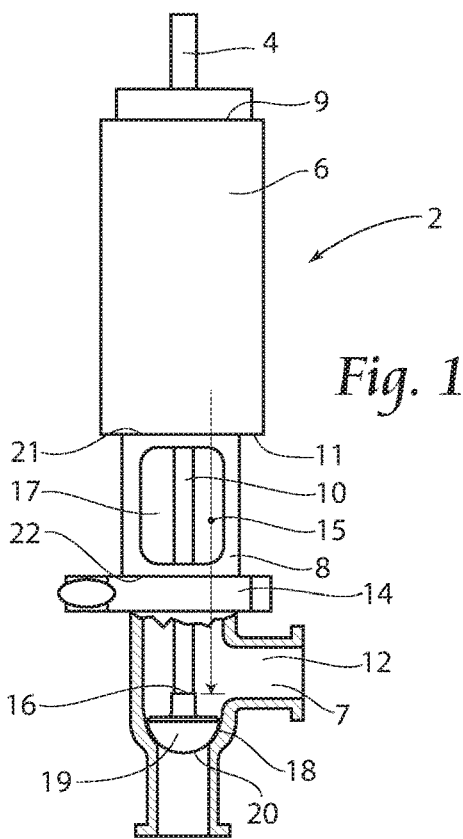
FIG. 1 is a system view of an actuated valve assembly containing an at least one valve stem seat.

As to FIG. 1, a system view of an actuated valve 2 containing an at least one valve stem seat 19, where the pneumatically actuated valve 2 comprises at least one actuation fluid in-Lake 4, an at least one cylinder 6, a frame structure 8, an at least one valve stem 10, an at least one valve stem seat 19, and a valve body 12. The at least one fluid in-Lake 4 is in communication with the at least one cylinder 6 at an at least one cylinder first end 9. The at least one fluid in-take 4 provides for fluid to enter the at least one cylinder 6. The intake of the fluid actuates an at least one valve mechanism (not illustrated in the figures). Alternatively, the at least one fluid in-take 4 is replaced by an at least one mechanical assembly (not illustrated in the figures) wherein the at least one mechanical assembly actuates the at least one valve mechanism in the at least one cylinder 6.

An at least one cylinder second end 11 is in communication with the frame structure 8 at an at least one frame structure first end 21. The frame structure 8 has a frame structure second end 22 in communication with the tube assembly 12. The frame structure 8 provides for a frame structure cavity 17 between an at least one of the frame structure first end 21 and the frame structure second end 22. The tube assembly 12 provides for a valve body cavity 7.

The at least one valve stem 10 is in communication with the at least one valve mechanism (not illustrated in the figures). The at least one valve stem 10 provides for a valve stem length 15, wherein the valve stem length 15 extends through the at least one cylinder first end 9, through the framed structure first end 21, into the frame structure cavity 17, through the frame structure second end 22, and into the valve body cavity 7. The valve stem length 15 provides for a valve stem first end 16. The valve stem first end 16 is in communication with the at least one valve stem seat 19.

The valve body 12 provides for an at least one parabolic valve seat 18. Wherein a stem seat head 20 of at least one of the at least one valve stem seat 19 is in removable communication with the at least one parabolic valve seat 18 to provide for control of the movement of the fluid. A clamping mechanism 14 is in communication with the frame structure 8 and the tube assembly 12, wherein the clamping mechanism 14 attaches the frame structure 8 to the valve body.

Figure 2:
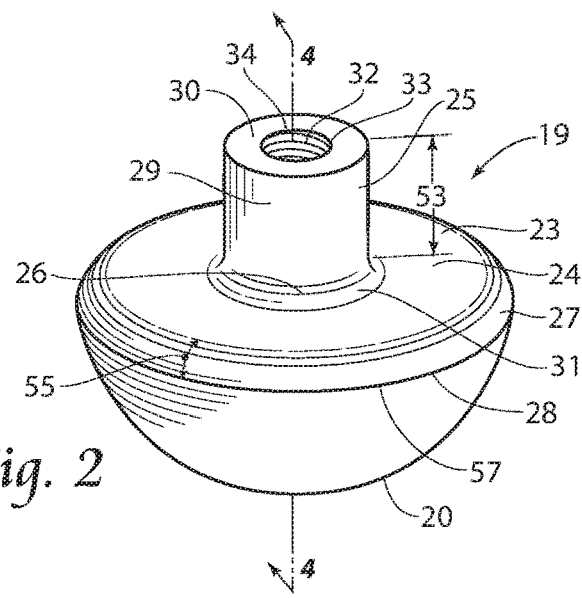
FIG. 2 is a top perspective view of the at least one valve stem seat oriented with a base assembly in an upward direction.

With attention to FIG. 2, FIG. 3, FIG. 4, and FIG. 5, an apparatus for the at least one valve stem seat 19 is described. As illustrated in FIG. 2, a perspective view of the at least one valve stem seat 19 oriented with a base assembly 23 in an upward direction, the at least one valve stem seat 19 comprises the base assembly 23 and the stem seat head 20. The base assembly 23 preferably has a circular geometry. Alternatively, the base assembly 23 may comprise an oval geometry. Alternatively, the base assembly 23 may comprise a polygonal geometry. A base assembly 23 comprises a base assembly first side 24 and a base assembly second side (not illustrated in the figures), opposite the base assembly first side 24.

A mounting extension 25 is in communication with the base assembly first side 24. The mounting extension 25 is preferably in fixed communication with the base assembly 23. Alternatively, the mounting extension may be in a removable communication with the base assembly 23. The base assembly 23 provides for a base assembly center 26. The mounting extension 25 has a mounting extension length 53, wherein the mounting extension 25 extends the mounting extension length 53 from the base assembly first side 24. The mounting extension 25 has a mounting extension first end 31 in communication with the base assembly 23. The mounting extension 25 has a mounting extension second end 30 spaced by the mounting extension length 53 from the mounting extension first end and the base assembly 23. The mounting extension second end 30 provides for a bore 32. The bore 32 comprises a bore wall 33. The bore wall preferably includes threading 34. Alternatively, the bore wall 33 may provide a smooth surface. Alternatively, the bore wall 33 provides for a grooved surface. The bore 32 provides for communication between the at least one valve stem 10 and the at least one valve stem seat 19.

The base assembly 23 has an arched perimeter 27. The arched perimeter 27 extends a length 55 opposite the mounting extension 25. The arched perimeter 27 has a terminal edge 28. The arched perimeter 27 and the base assembly 23 characterize a perimeter 57 at the terminal edge 28.

Figure 3:
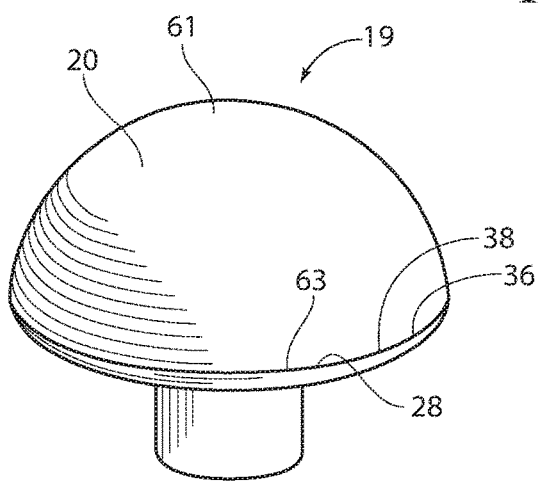
FIG. 3 is a top perspective view of the at least one valve stem seat oriented with a base assembly in a downward direction.

As illustrated in FIG. 3, a perspective view of the at least one valve stem seat 19 oriented with a base assembly 23 in a downward direction, the stem seat head 20 has a hemispherical geometry 61. The hemispherical geometry 61 of the stem seat head 20 is characterized by a stem seat head terminal edge 38. The stem seat head terminal edge 38 characterizes a stem seat head perimeter 63. The terminal edge 28 and the stem seat head terminal edge 38 are preferably in continuous communication about a terminal edge/stem seat head terminal edge intersection 36. Alternatively, the terminal edge 28 and the stem seat head terminal edge 38 may be in discontinuous communication about a terminal edge/stem seat head terminal edge intersection 36.

Figure 4:
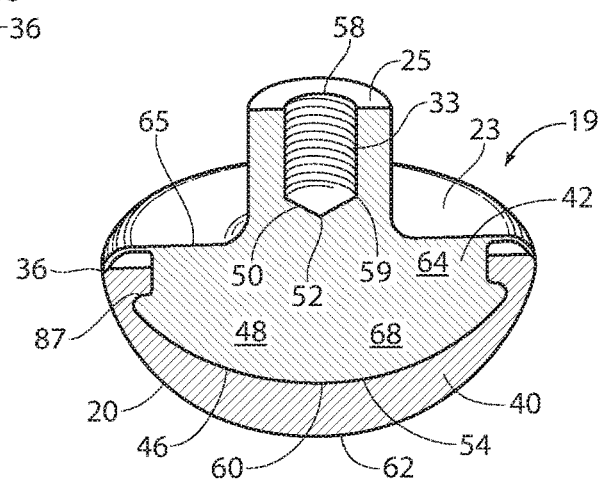
FIG. 4 is a cross-sectional view of the at least one valve stem seat taken along line 4-4 in FIG. 2.
Figure 6C:
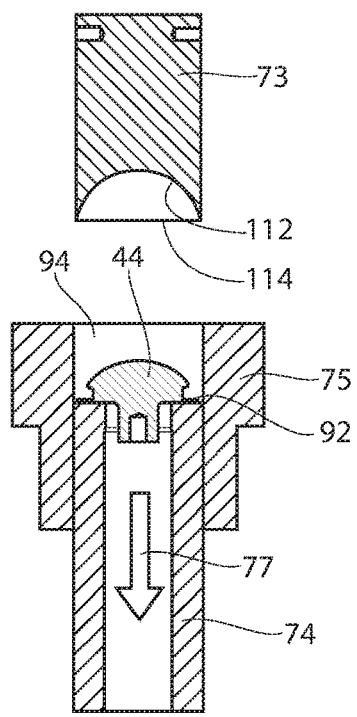
FIG. 6C is a cross-sectional view of the method for making the at least one valve stem seat, illustrating lowering the bottom punch.
Figure 6D:
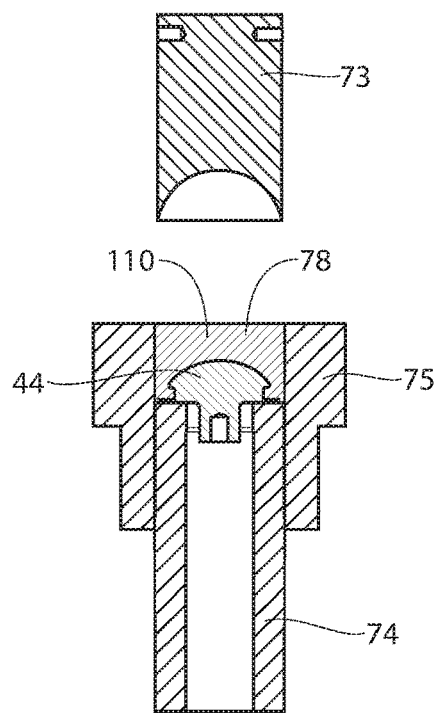
FIG. 6D is a cross-sectional view of the method for making the at least one valve stem seat, illustrating application of resin.
Figure 6E:
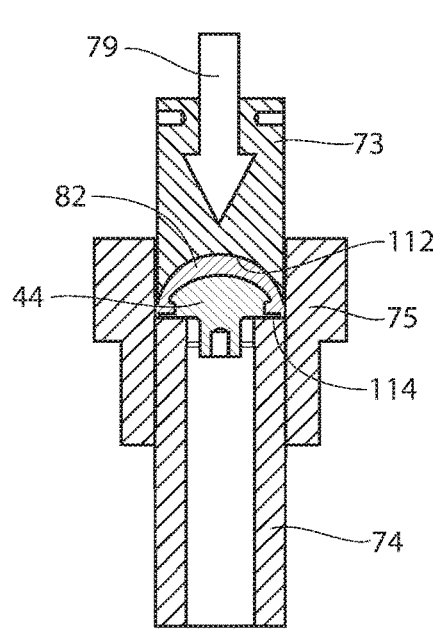
FIG. 6E is a cross-sectional view of the method for making the at least one valve stem seat, illustrating application lowering the upper punch.
Figure 6F:
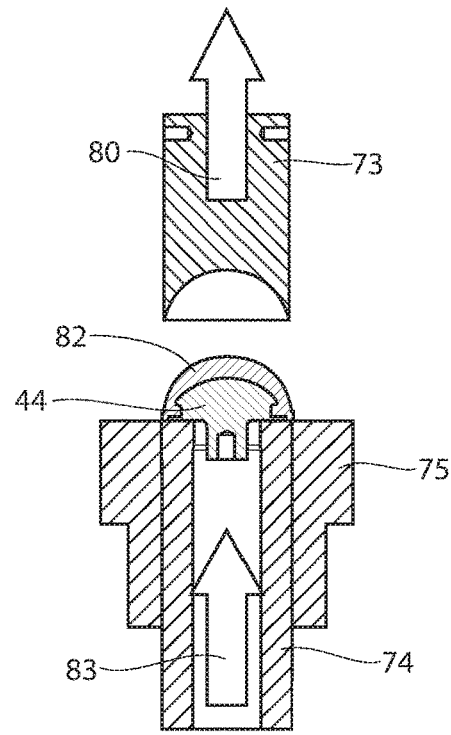
FIG. 6F is a cross-sectional view of the method for making the at least one valve stem seat, illustrating application raising the upper punch, and raising the bottom punch.
Figure 7A:
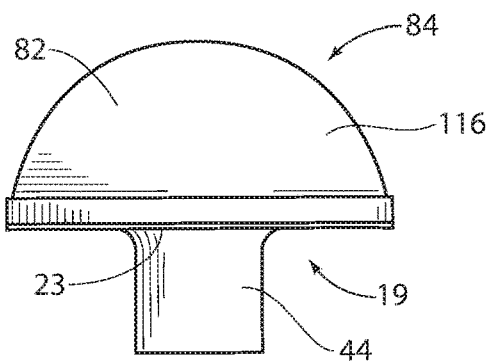
FIG. 7A is a side view illustrating a post molding process valve stem seat.
Figure 7B:
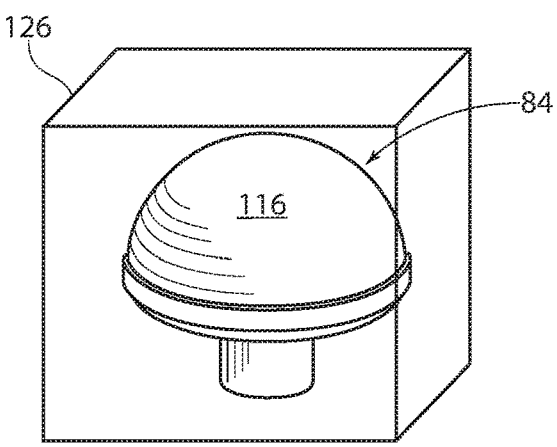
FIG. 7B is a perspective view illustrating the sintering process.

As illustrated in FIG. 4, a cross-sectional view of the at least one valve stem seat 19, and FIG. 5, an exploded side view of the at least one valve stem seat 19, the at least one valve stem seat 19 comprises a finished valve stem seat blank 42 in communication with a shell 40. The finished valve stem seat blank 42 comprises a first section 64, a second section 68, the base assembly 23 and the mounting extension 25. The first section 64 comprises a first section first side 65, and first section second side 67 opposite the first section first side 65. The first section first side 65 is in communication with the base assembly second side (not illustrated in the figures). The first section second side 67 is in communication with a second section base 97. The second section 68 is characterized by the second section base 97 in communication with a second section hemisphere 54. The first section/second section combination 48 is characterized by first section/second section combination perimeter 46.

The first section 64 is characterized by a cylindrical shape 81. The cylindrical shape 81 has a first section diameter 72. The second section base 97 is characterized by a second section base diameter 70. The first section diameter 72 is less than the second section base diameter 97. A lip 87 defines the differences in the first section diameter 72 and the second section base diameter 97.

The shell 40 comprises a shell first side 60 and a shell second side 62. The shell second side 62 defines the hemispherical geometry 61 of the stem seat head 20. The shell first side 60 provides a negative geometry 102 of the first section/second section perimeter 46 wherein the shell first side 60 is in substantially continuous communication with the first section/second section perimeter 46. The negative geometry 102 of the shell first side 40 provides for a shelf 91, wherein the lip 87 and shelf 91 are in substantial communication to provide for retaining the shell 40 to the finished valve stem seat blank 42.

The bore 32 of the mounting extension 25 is defined by bore first end 58 and a terminus 52, separated by a bore length 29. The bore first end 58 is in communication with the mounting extension second end 30. The terminus 52 is in close proximity to the base assembly 23 and the bore first end 31. At a position 59 along the bore length 29 of the bore 32, the bore 32 provides for a tapered orientation 50. The tapered orientation is defined by the position 59 and the terminus 52.

It is noted that at least one valve stem seat 19 comprises the mounting extension 25, base assembly 23, first section 64 and second section 68, wherein the at least one valve stem seat 19 is a singular unit. The at least one valve stem seat 19 is preferably comprised of stainless steel.

The shell 40 is preferably comprised of a resin 110 of Polytetrafluoroethylene (PTFE) 84. Alternatively, the shell 40 may be comprised of another material providing the desired wear and sealing properties.

An intended benefit of the invention is to provide for a valve stem seat having the structural integrity to withstand impact when the valve is closed.

An intended benefit of the invention is to provide for a valve stem seat which withstands degradation due to the application of chemical and sanitizing cleaning solutions.

With attention to FIG. 6A, FIG. 6B, FIG. 6C, FIG. 6D, FIG. 6E, FIG. 6F, FIG. 7A, FIG. 7B, FIG. 8A, FIG. 8B, FIG. 8C, and FIG. 8C, a method of manufacturing the least one valve stem seat 19 is described. As illustrated in FIGS. 6A to 6F, the method of manufacturing the at least one valve stem seat 19 involves a compression molding process including positioning an upper punch in close proximity to a bottom punch assembly 104. The bottom punch assembly 104 comprises a bottom punch 74 and collar 75. The bottom punch 74 has a bottom punch perimeter 106. The collar 75 is in communication with the bottom punch perimeter 106, wherein the collar 75 surrounds the bottom punch 74, 72. The bottom punch 74 is in a bottom punch first position 96. A stem seat blank 44 is placed on a bottom punch first surface 108, 76. The bottom punch 74, with the stem seat blank 44 on the bottom punch first surface 108, is lowered to a bottom punch second position 92, 77. Lowering the bottom punch 74 to the bottom punch second position 92 creates a cavity 94, 72. The cavity 94 is filled with a resin 110, 78. Preferably, the resin 1107 is PTFE 84. Alternatively, the resin 110 may be another material providing the desired wear and sealing properties. The upper punch 73, containing a hemispherical cross-section 112 on an upper punch first side 114, is lowered wherein the upper punch first side 114 is in close communication with the bottom punch first surface 108, 79. The lowering of the upper punch 73 forms a first dimension 82 of the stem seat head 20. The upper punch 80 is next raised. The bottom punch 74 is raised to the lower punch first position 96, 83. As shown in FIG. 7, the method of manufacturing the at least one valve stem seat 19 is continued by removing a post molding process valve stem seat 116 from the bottom punch 74, and placing the post molding process valve stem seat 116 in a sintering oven 126 (FIG. 7B), to cure the PTFE 84.

Figure 8A:
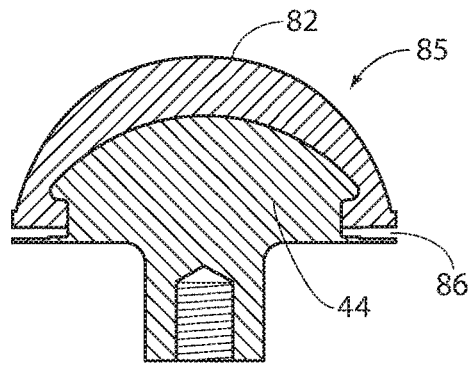
FIG. 8A is a cross-sectional view of the method for making the at least one valve stem seat, illustrating a second dimension of a stem seat head.
Figure 8B:
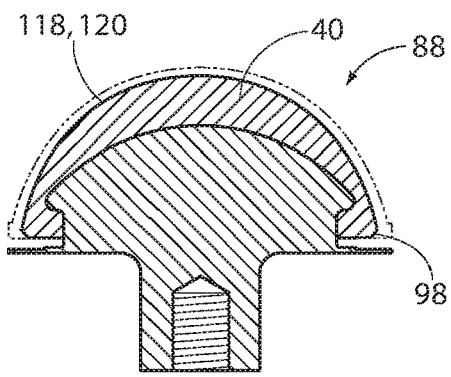
FIG. 8B is a cross-sectional view of the method for making the at least one valve stem seat, illustrating turning a chamfer.
Figure 8C:
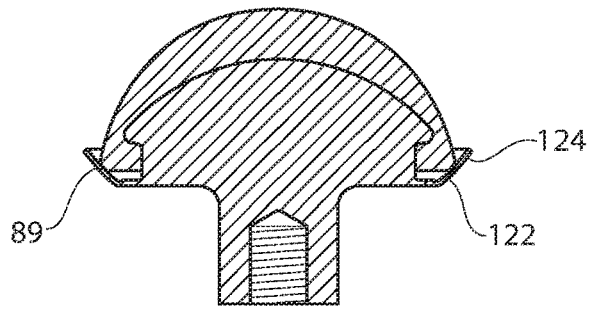
FIG. 8C is a cross-sectional view of the method for making the at least one valve stem seat, illustrating rolling a metal flange over the chamfer.
Figure 8D:
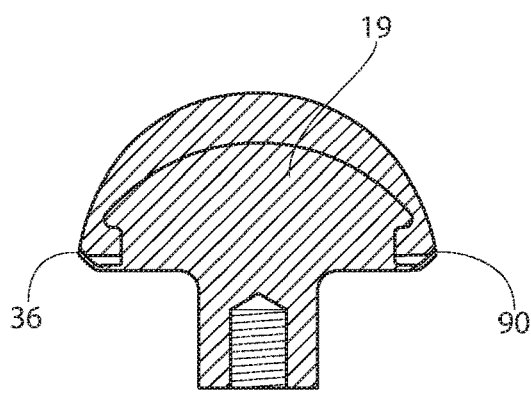
FIG. 8D is a cross-sectional view of the method for making the at least one valve stem seat, illustrating removing excess metal flange to create a profile finish of a terminal edge/stem seat head terminal edge intersection.

As illustrated in FIGS. 8A to 3D, the method of manufacturing the at least one valve stem seat 19 is further described, the method of manufacturing the at least one valve stem seat 19 involves a lathe turning process. The sintering oven reduces the first dimension 82 of the stem seat head 20 to a second dimension 118 of the stem seat head 20, thereby creating a gap 36 between the post-sintering shell 120 and base assembly 23, 85. Turning a chamfer 93 on the post-sintering shell 120 having a second dimension 118 of the stem seat head 20, creates the shell 40, 88. Rolling a metal flange 122 of the base assembly 23 over the chamfer 98, creates the arched perimeter 27 of the base assembly 23, 89. Removing excess metal flange 124, creates a profile finish 90 of the terminal edge/stem seat head terminal edge intersection 36 and the at least one stem seat valve 19.

An intended benefit of the invention is to provide for a method of manufacturing a valve stem seat possessing the structural integrity to withstand impact when the valve is closed, and possessing properties which withstand degradation due to the application of chemical cleaning and sanitizing solutions.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A valve stem seat comprising:
a blank and a shell in molded communication;
said blank having a first section, a second section, a base assembly, and an extension;
said base assembly having a first side and a second side opposite said first side, wherein said extension in communication with said first side;
said first section in communication with said second side;
said second section having a second section base;
said second section base in communication with said first section, opposite said second side, wherein said communication provides for a lip;
said shell having a shell first side and a shell second side, wherein said shell second side having a hemispherical geometry defining said valve stem seat;
said shell first side providing for a shelf, wherein communication of said lip and said shelf retains said shell in communication with said blank; and
said base assembly having a terminal edge, defining an arched perimeter, extending opposite said extension, said terminal edge and said shell in communication to provide a profile finish.

2. The valve stem seat of claim 1, further comprising said first section having a cylindrical shape.

3. The valve stem seat of claim 1, further comprising said second section having said second section base in communication with a second section hemisphere, wherein said second section hemisphere is in communication with said shell first side.

4. The valve stem seat of claim 1, further comprising said extension having a first end, a second end and a length separating said first end and said second end.

5. The valve stein seat of claim 4, wherein said first end is affixed to said first side.

6. The valve stem seat of claim 4, wherein said second end provides for a bore.

7. The valve stem seat of claim 6, further comprising said bore having a bore first end in communication with said second end.

8. The valve stem seat of claim 1, further comprising said first section having a first section first side opposite a first section second side, wherein said first section first side is in communication with said second side and said first section second side is in communication with said second section.

9. The valve stem seat of claim 1, further comprising said first section having a first diameter and said second section base having a second diameter, wherein a difference in said first diameter and said second diameter provides for said lip.

10. The valve stem seat of claim 1, further comprising said shell first side having a concave surface, wherein said shell first side is in substantial communication with at least one of said first section and said second section.

11. The valve stem seat of claim 10, wherein said concave surface provides for said shelf.

* * * * *

UNITED STATES PATENT AND TRADEMARK OFFICE
CERTIFICATE OF CORRECTION

PATENT NO. : 11,035,486 B2
APPLICATION NO. : 16/385617
DATED : June 15, 2021
INVENTOR(S) : Jon Scharrer It is certified that error appears in the above-identified patent and that said Letters Patent is hereby corrected as shown below:

In the Claims

Column 8, Claim 5, Line 29, "...valve stein..." should read --...valve stem...--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*